(12) United States Patent
Hung

(10) Patent No.: US 7,520,025 B2
(45) Date of Patent: Apr. 21, 2009

(54) HINGE FOR A NOTEBOOK EXTENSION PAD

(75) Inventor: Shun-Yu Hung, Shulin (TW)

(73) Assignee: Shin Zu Shing Co., Ltd. (TW)

( * ) Notice: Subject to any disclaimer, the term of this patent is extended or adjusted under 35 U.S.C. 154(b) by 94 days.

(21) Appl. No.: 11/882,184

(22) Filed: Jul. 31, 2007

(65) Prior Publication Data
US 2009/0031529 A1    Feb. 5, 2009

(51) Int. Cl.
    *E05C 17/64* (2006.01)
(52) U.S. Cl. .......................................... 16/337; 16/340
(58) Field of Classification Search .................. 16/337, 16/342, 255, 277, 319, 321, 327, 328, 329, 16/330; 361/681
See application file for complete search history.

(56) References Cited

U.S. PATENT DOCUMENTS 6,564,998 B1 * 5/2003 Oross et al. .................. 235/382
7,047,599 B2 * 5/2006 Oshima et al. ................ 16/337
2005/0204509 A1 * 9/2005 Lin et al. ...................... 16/342
2007/0091552 A1 * 4/2007 Liang et al. .................. 361/681
2007/0252066 A1 * 11/2007 Iwai et al. ................. 248/372.1

* cited by examiner

*Primary Examiner*—Victor Batson
*Assistant Examiner*—Matthew Sullivan
(74) *Attorney, Agent, or Firm*—Hershkovitz & Associates, LLC; Abraham Hershkovitz

(57) ABSTRACT

A hinge for a notebook extension pad is mounted in an expansion pad of a notebook and has a pivoting assembly, a positioning disk, a limiting stationary leaf, a limiting disk, a pressing assembly and a locking assembly. The expansion pad has a mounting segment and a pad having an external lock. The pivoting assembly is mounted securely on the pad and has a shaft. The positioning disk is mounted around the shaft. The limiting stationary leaf is adjacent to the positioning disk, is mounted rotatably around the shaft and connects with the mounting segment. The limiting disk limits movement of the pad relative to the mounting segment. The pressing assembly provides friction against movement of the hinge. The locking assembly is mounted around the shaft and allows a user to lock the pad at a designed angle to achieve a comfortable height and angle for operating the notebook.

8 Claims, 10 Drawing Sheets

HINGE FOR A NOTEBOOK EXTENSION PAD

BACKGROUND OF THE INVENTION

1. Field of the Invention

The present invention relates to a hinge, and more particularly to a hinge mounted in a notebook extension pad to allow the extension pad to rotate for adjusting an operating height and angle of the notebook.

2. Description of the Prior Arts

As notebooks have become an essential business and personal tool, peripheral products such as extension pads are designed to make the notebook more convenient to use. An extension pad allows the notebook to stay thin and small while providing a user space to add their desired functionality, such as an extra hard disk, fan or the like and is mounted below the notebook to alter an operating height and angle for the user. However, the extension pad can only be parallel to the surface it is placed on so the user cannot adjust the angle to operator the notebook. Additionally, when giving small presentations the notebook cannot be displayed well.

To overcome the shortcomings, the present invention provides a hinge for a notebook extension pad to mitigate or obviate the aforementioned problems.

SUMMARY OF THE INVENTION

The primary objective of the present invention is to provide a hinge mounted in a notebook extension pad to allow the extension pad to rotate and position the notebook at a comfortable operating height and angle.

A hinge for a notebook extension pad is mounted in an expansion pad of a notebook and has a pivoting assembly, a positioning disk, a limiting stationary leaf, a limiting disk, a pressing assembly and a locking assembly. The expansion pad has a mounting segment and a pad having an external lock. The pivoting assembly is mounted securely on the pad and has a shaft. The positioning disk is mounted around the shaft. The limiting stationary leaf is adjacent to the positioning disk, is mounted rotatably around the shaft and connects with the mounting segment. The limiting disk limits movement of the pad relative to the mounting segment. The pressing assembly provides friction against movement to the hinge. The locking assembly is mounted around the shaft and allows a user to lock the pad at a designed angle to achieve a comfortable height and angle for operating the notebook.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
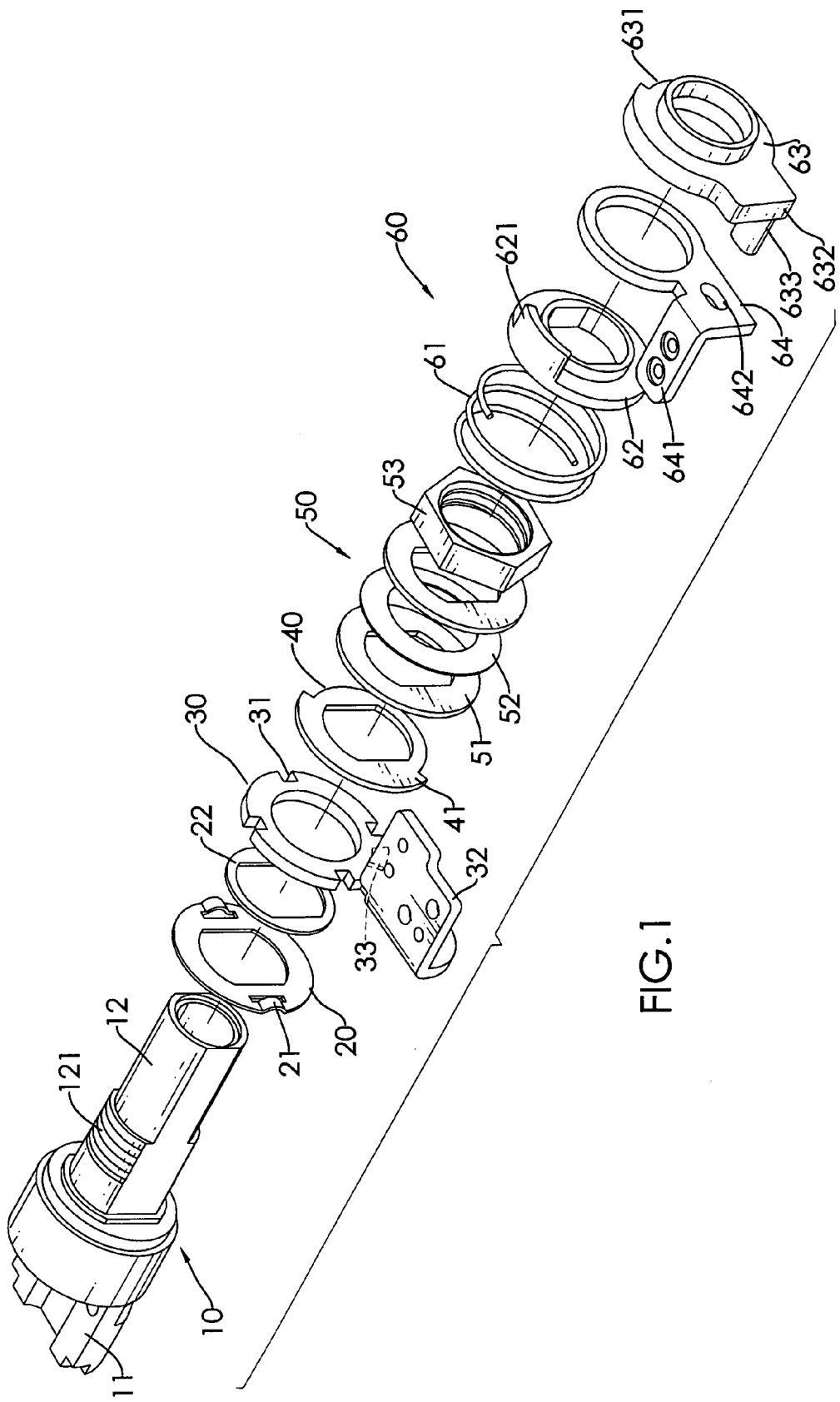
FIG. 1 is an exploded perspective view of a hinge for a notebook extension pad in accordance with the present invention.
Figure 2:
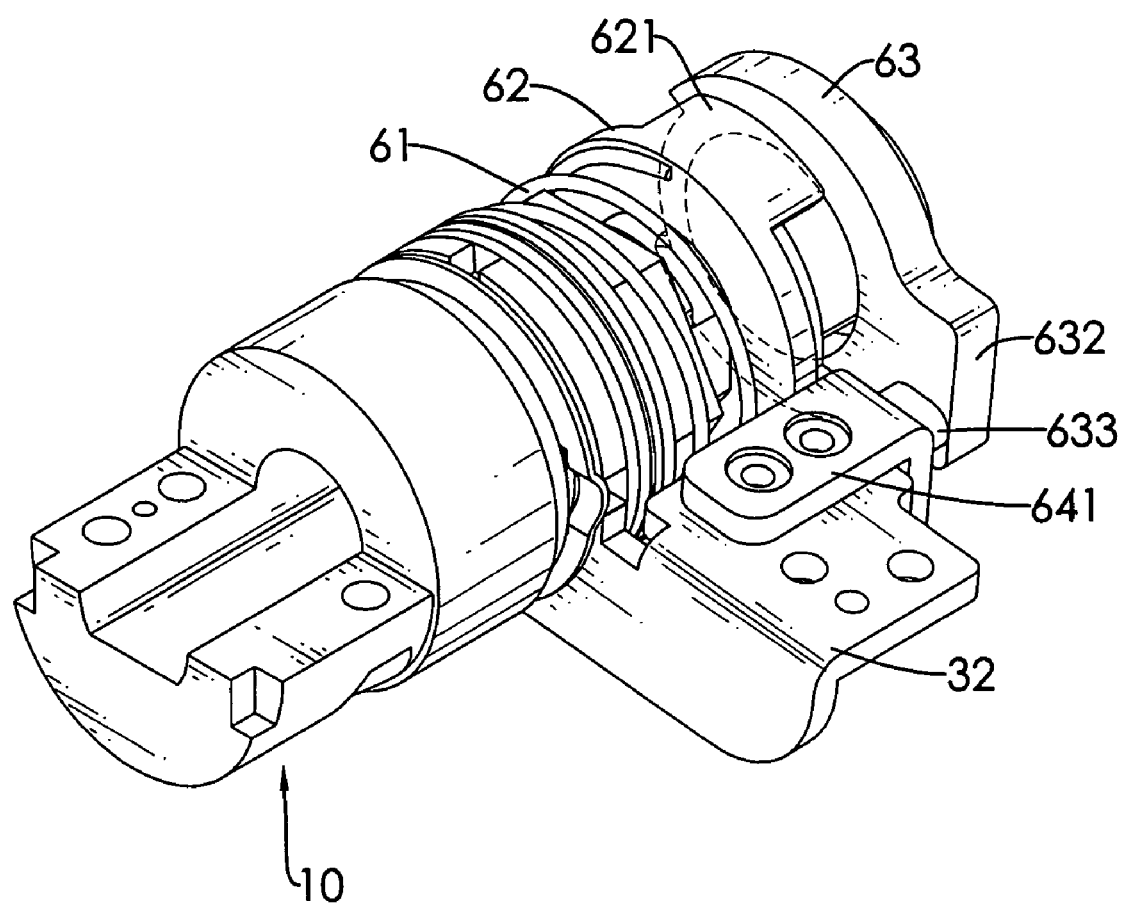
FIG. 2 is a perspective view of the hinge in FIG. 1.

With reference to FIGS. 1, 2, 4 and 9, a hinge for a notebook extension pad in accordance with the present invention is mounted in an extension pad (70) and comprises a pivoting assembly (10), a positioning disk (20), a limiting stationary leaf (30), a limiting disk (40), a pressing assembly (50) and a locking assembly (60).

Figure 5:
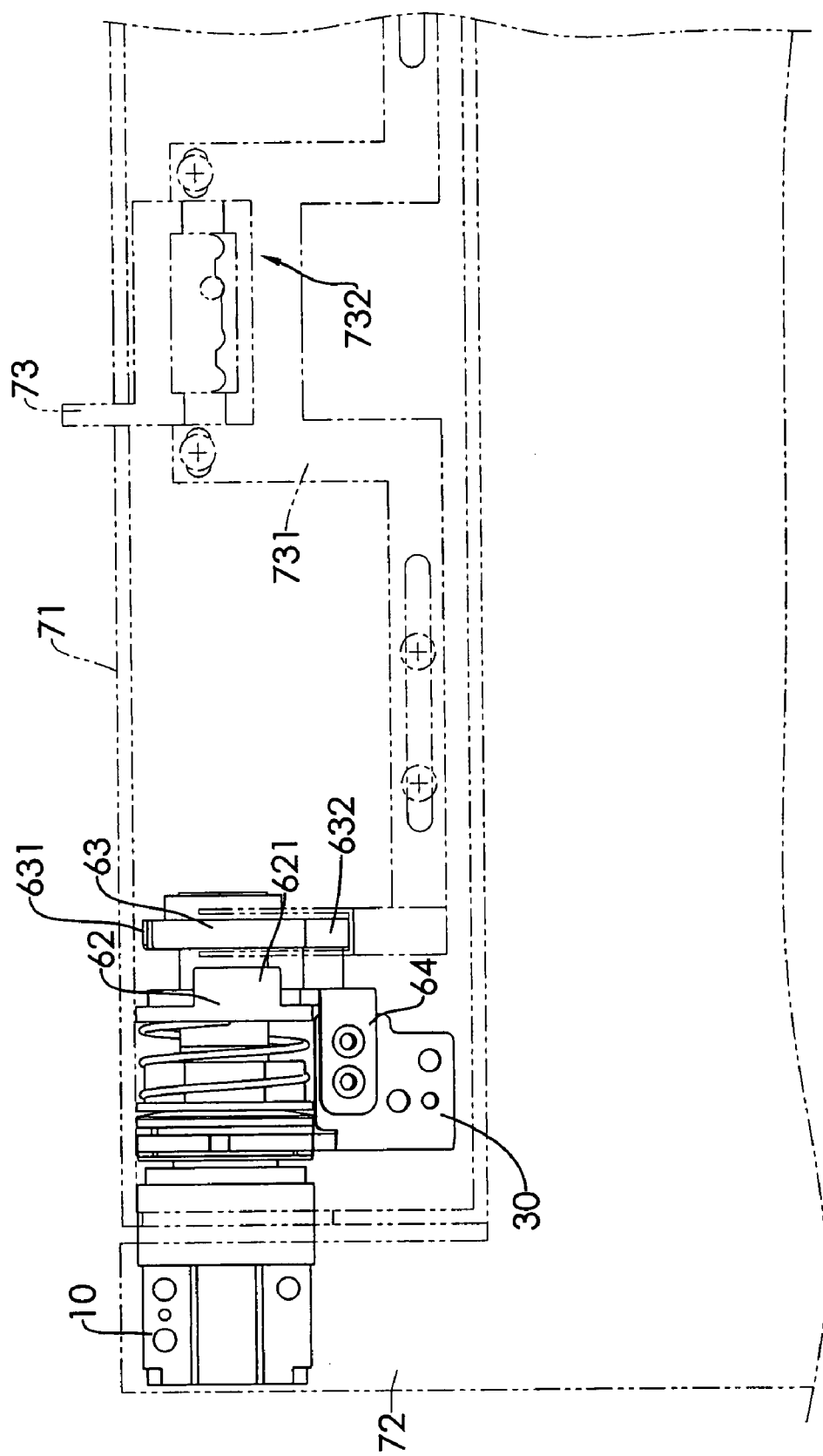
FIG. 5 is an enlarged top view of the hinge in FIG. 1 mounted in an expansion pad.

With further reference to FIG. 5, the extension pad (70) is designed for a notebook (80) and has a mounting segment (71), a pad (72) and an external lock (73).

The mounting segment (71) is mounted on the notebook (80) and has two ends and a rear.

The pad (72) is a flat panel, corresponds to the notebook (80) and is connected pivotally to the mounting segment (71).

The external lock (73) is mounted slidably in and extends out of the mounting segment (71), has a sliding bracket (731) and a lock (732). The sliding bracket (731) may be connected securely with the external lock (73), is mounted slidably in the mounting segment (71) and comprises at least one proximal end. The lock (732) selectively prevents the sliding bracket (731) from moving.

The pivoting assembly (10) is mounted in the extension pad (70) and has an inner end, an outer end, a mounting leaf (11) and a shaft (12).

The mounting leaf (11) is formed on and extends from the outer end of the pivoting assembly (10) and is mounted securely in the pad (72).

The shaft (12) is keyed, is formed on and extends from the inner end of the pivoting assembly (10) and has a middle, a distal end, and may have a threaded segment (121). The threaded segment (121) is formed on the middle of the shaft (12).

Figure 3:
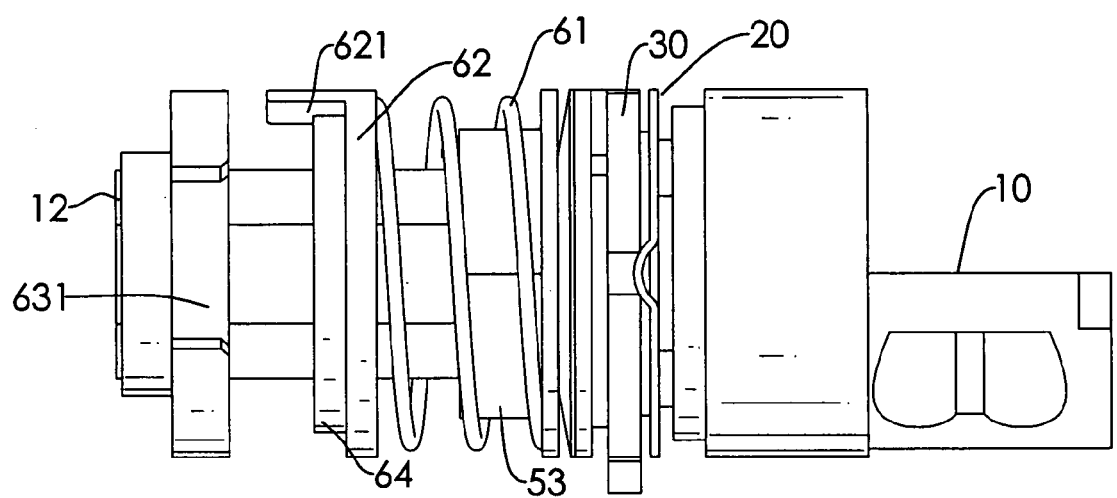
FIG. 3 is a rear view of the hinge in FIG. 1.
Figure 4:
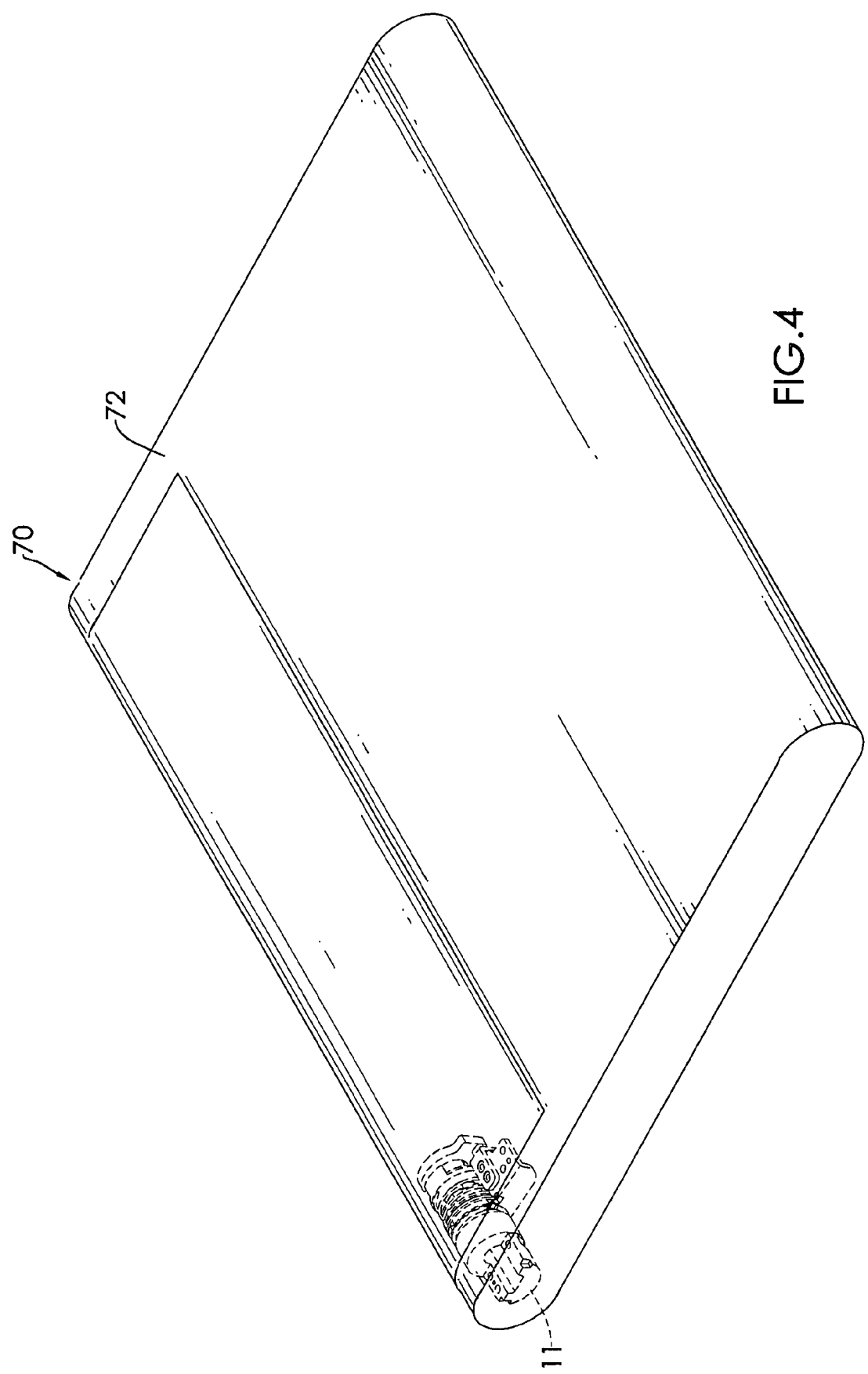
FIG. 4 is a perspective view of the hinge in FIG. 1 mounted in an expansion pad.

With further reference to FIG. 3, the positioning disk (20) is mounted coaxially and securely around the shaft (12) and has an inner surface, a keyed hole, at least one positioning protrusion (21) and an optional spacer (22). The keyed hole is formed through the positioning disk (20) and corresponds to and engages the shaft (12). Each positioning protrusion (21) is formed on and protrudes from the inner surface of the positioning disk (20) and may be convex.

The spacer (22) corresponds to and is mounted securely around the shaft (12) and is adjacent to the inner surface of the positioning disk (20).

The limiting stationary leaf (30) is rotatably mounted coaxially around the shaft (12), is adjacent to the inner surface of the positioning disk (20) and has an edge, an inner surface, a pivoting hole, multiple detents (31), a mounting protrusion (32) and a boss (33).

The pivoting hole is round, is formed coaxially through the limiting stationary leaf (30) and is mounted rotatably around the shaft (12).

The detents (31) are formed separately in the edge of the limiting stationary leaf (30) and correspond to and selectively engage the positioning protrusion (21) to temporarily hold the pad (72) in various positions when pivoting relative to the mounting segment (71).

The mounting protrusion (32) is formed on and extends from the edge of the limiting stationary leaf (30) and is mounted securely on the mounting segment (71) to allow the pad (72) to pivot relative to the mounting segment (71).

The boss (33) is formed on and protrudes from the inner surface of the limiting stationery leaf (30).

The limiting disk (40) is coaxially mounted securely around the shaft (12), is adjacent to the inner surface of the limiting stationary leaf (30) and has an edge, a keyed hole and a positive stop (41).

The keyed hole is formed coaxially through the limiting disk (40), corresponds to and is mounted around the shaft (12).

Figure 10:
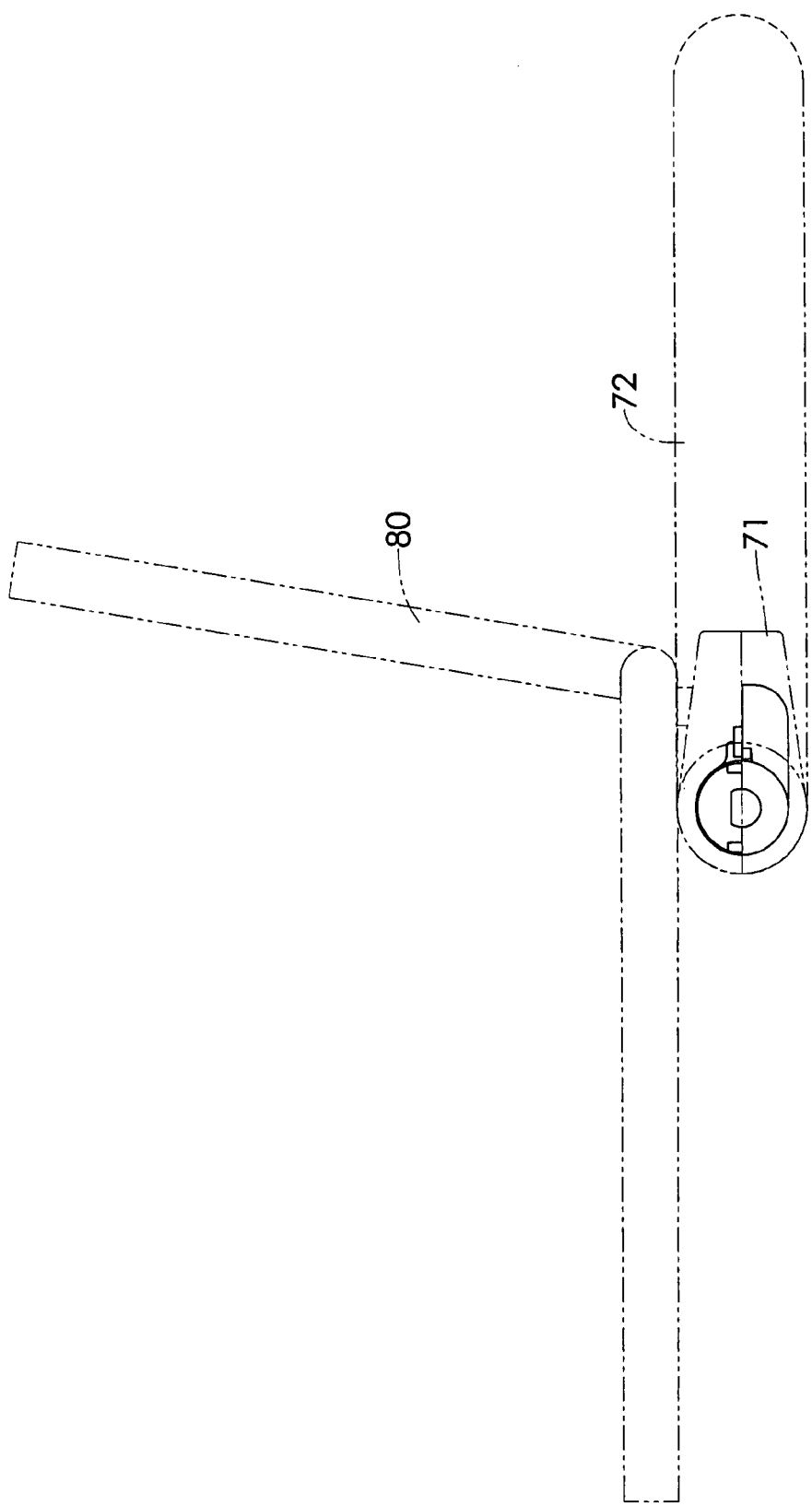
FIG. 10 is an operational side view of the hinge in FIG. 1 mounted in an extension pad.

With further reference to FIG. 10, the positive stop (41) may be a tab, is formed on and protrudes radially from the edge of the limiting disk (40), corresponds to and selectively abuts the boss (33) when rotating to limit rotation of the pad (72) relative to the mounting segment (71).

The pressing assembly (50) is mounted coaxially around the shaft (12), is adjacent to the inner surface of the limiting disk (40), presses and holds the limiting disk (40), the limiting stationary leaf (30) and the positioning disk (20) together and provides friction against movement of the hinge and may comprise two keyed washers (51), a resilient spacer (52) and a nut (53).

The keyed washers (51) are coaxially mounted securely around the shaft (12), one of the keyed washers (51) presses the limiting disk (40) and each keyed washer has a keyed hole. The keyed hole is formed coaxially through the keyed washer (51) and corresponds to and is mounted around the shaft (12).

The resilient spacer (52) is rotatably mounted coaxially around the shaft (12) between the two keyed washers (51) to provide a pressing force and has a pivoting hole. The pivoting hole is round, is formed coaxially through the resilient spacer (52) and is mounted rotatably around the shaft (12).

The nut (53) is mounted securely around the threaded segment (121) of the shaft and abuts one of the keyed washers (51).

The locking assembly (60) is mounted around the shaft (12) near the distal end of the shaft (12), is adjacent to the pressing assembly (50) and has a spring (61), a lock ring (62), a sliding lock (63) and a locking stationary leaf (64).

The spring (61) is mounted around the shaft (12) and presses against the pressing assembly (50).

The locking ring (62) is mounted slidably around the shaft (12), is adjacent to and abuts the spring (61) and has an inner surface, an outer surface, a keyed hole, an edge and a locking protrusion (621). The outer surface presses against the spring (61). The keyed hole is formed coaxially through the locking ring (62), corresponds to and engages the shaft (12). The locking protrusion (621) is formed on and protrudes perpendicularly away from the inner surface of the locking ring (62), near the edge.

Figure 6:
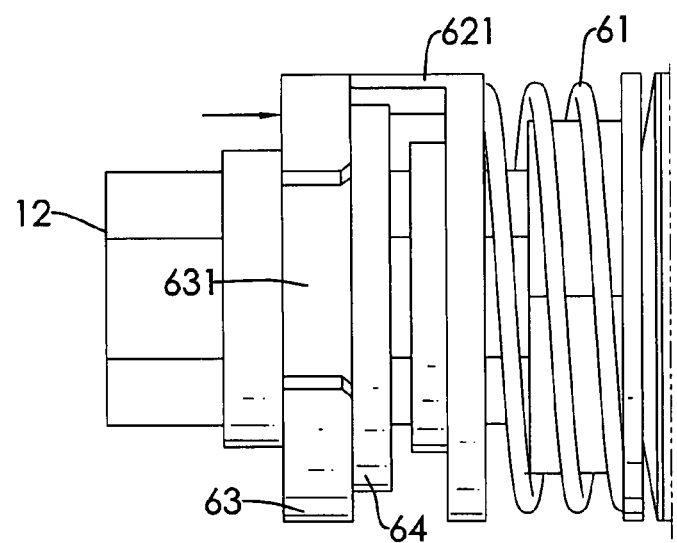
FIG. 6 is an enlarged operational partial rear view of the hinge in FIG. 1 with a sliding lock moving toward a locking ring.

With further reference to FIG. 6, the sliding lock (63) is mounted slidably and rotatably around the shaft (12), is connected securely to and is moved by the external lock (73), selectively presses the locking ring (62) against the spring (61) by sliding the external lock (73) toward the hinge, holds the locking ring (62) in position because the lock (732) stops movement of the external lock (73) and has an edge, a through hole, a locking notch (631), a handle (632) and an optional sliding protrusion (633).

The through hole is round, is formed coaxially through the sliding lock (63) and is mounted around the shaft (12).

Figure 7:
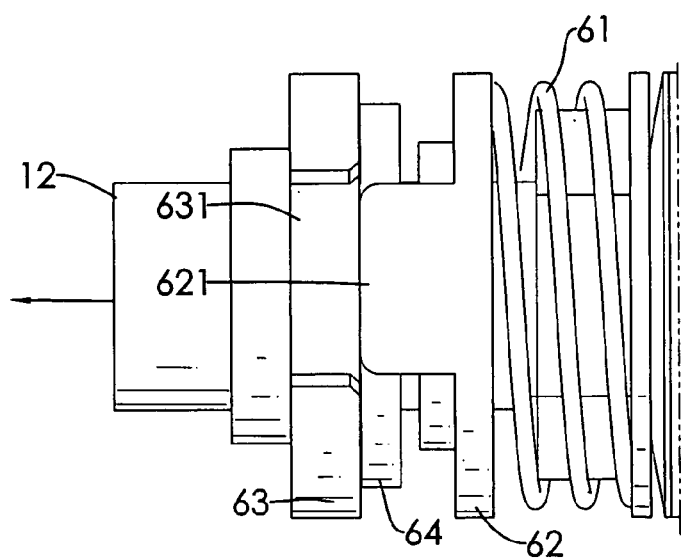
FIG. 7 is an enlarged operational partial rear view of the hinge in FIG. 1 with the locking ring rotating with a shaft.
Figure 8:
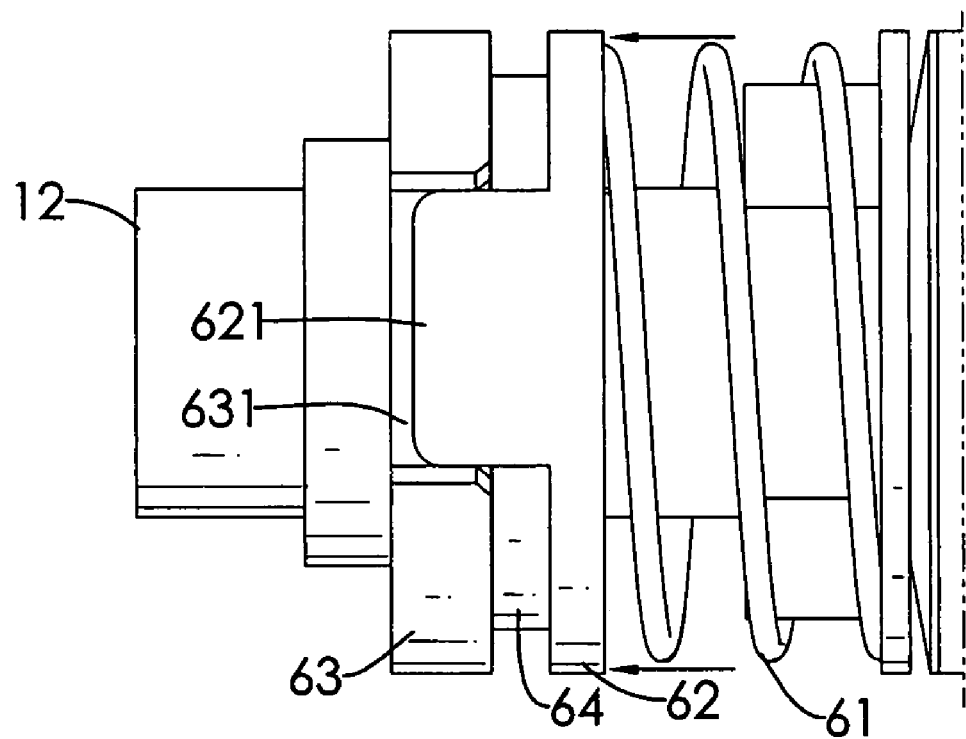
FIG. 8 is an enlarged operational partial rear view of the hinge in FIG. 1 with the sliding lock engaging the locking ring.
Figure 9:
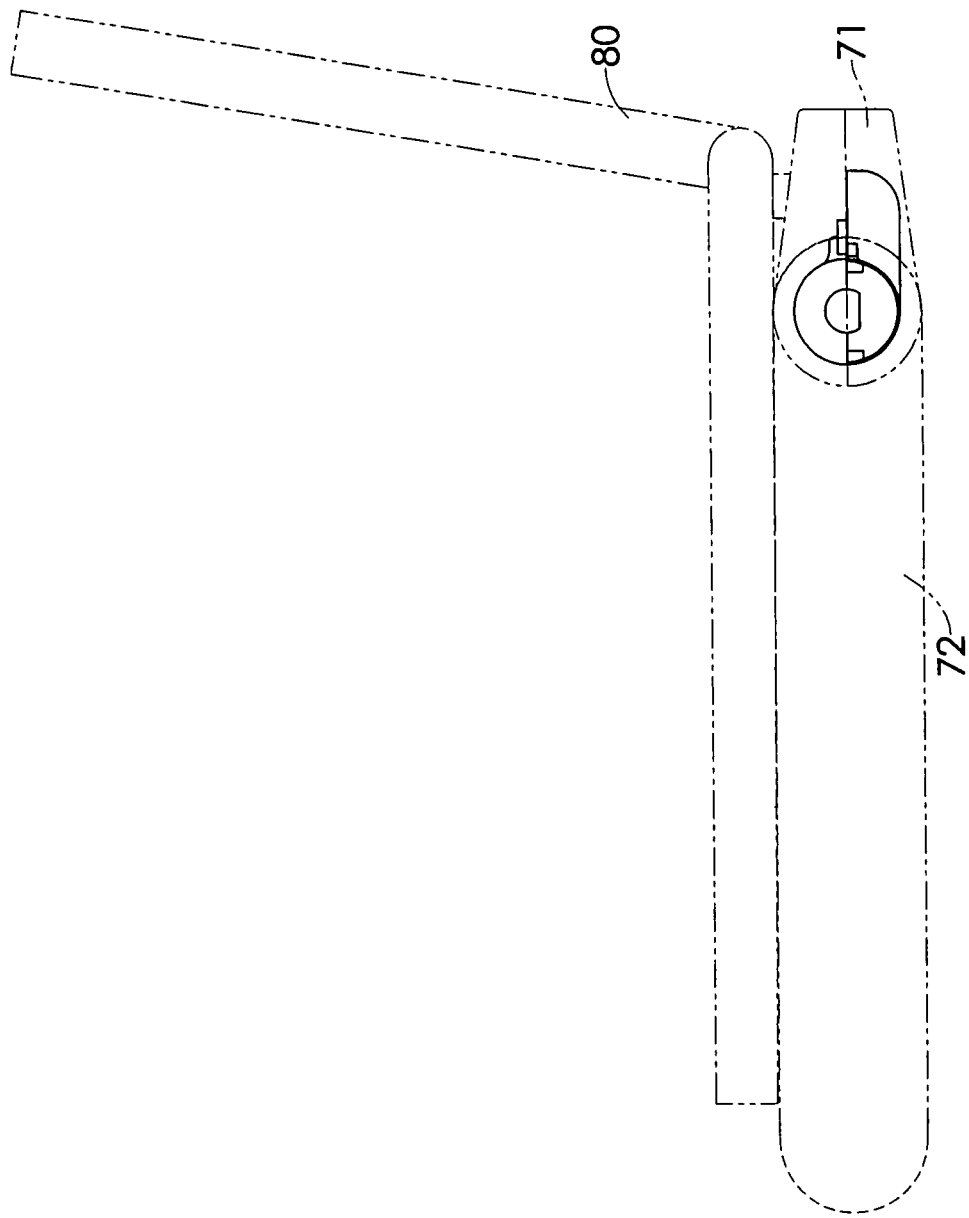
FIG. 9 is an operational side view of the hinge in FIG. 1 applied in an extension pad mounted below a notebook.
Figure 11:
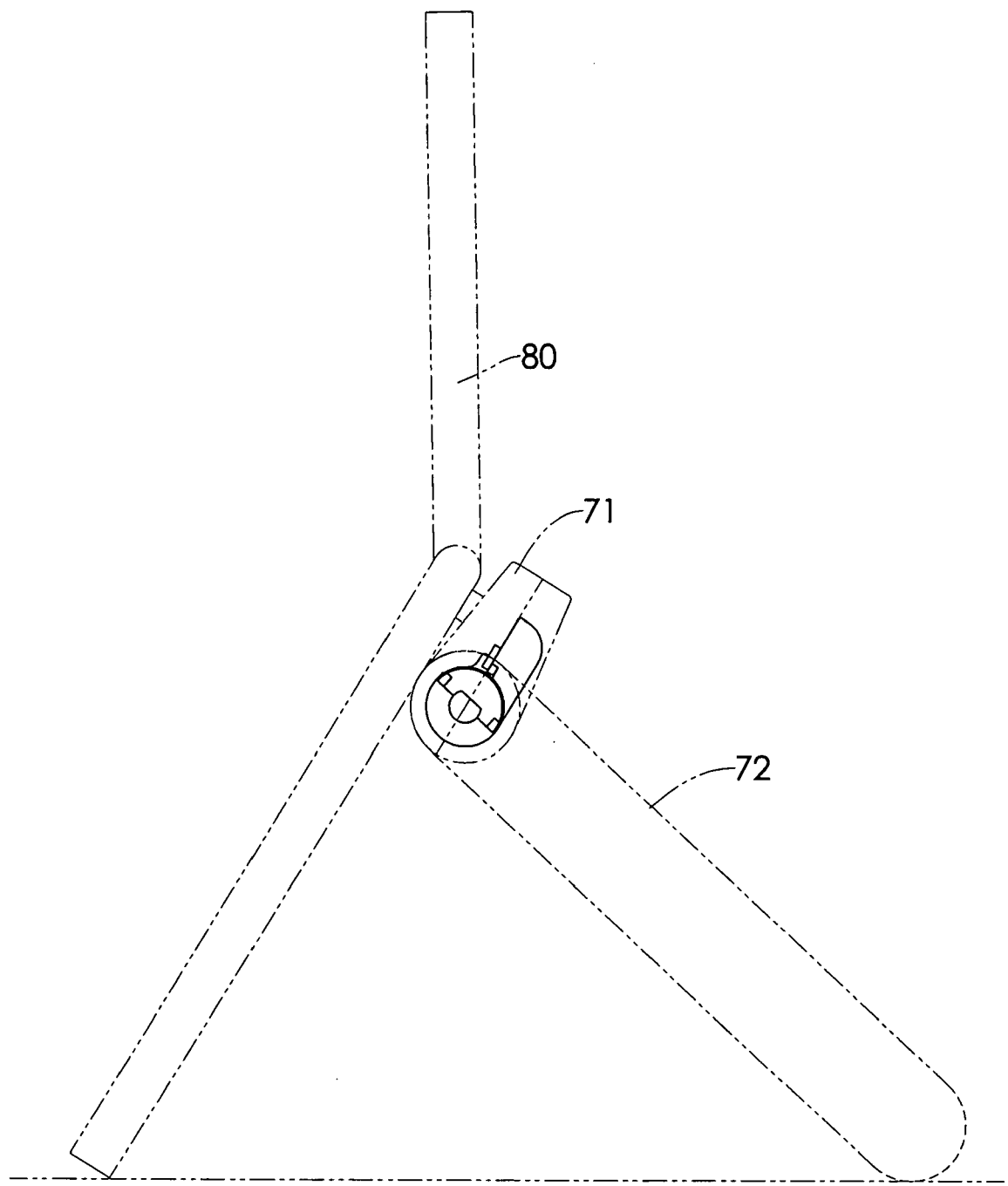
FIG. 11 is an operational side view of the hinge in FIG. 1 mounted in an extension pad with the pad held at a designed position to hold the notebook at a preferred operating angle.

With further reference to FIGS. 7, 8 and 11, the locking notch (631) is formed in the edge of the sliding lock (63), corresponds to the locking protrusion (621) and selectively engages the locking protrusion (621) when the pad (72) pivots to a designed angle relative to the mounting segment (71), such that the pad (72) is held at the designed angle.

The handle (632) is formed on and extends from the edge of the sliding lock (63), is connected to the proximal end of the sliding bracket (731) and has an outer surface.

The sliding protrusion (633) is formed on and extends perpendicularly from the outer surface of the handle (632).

The locking stationary leaf (64) is mounted between the locking ring (62) and the sliding lock (63), is mounted rotatably around the shaft (12), is connected securely to the limiting stationary leaf (30), abuts the locking ring (62) and has an outer surface, a through hole, an edge, a mounting protrusion (641) and an optional sliding hole (642).

The outer surface of the locking stationary leaf (63) abuts the inner surface of the locking ring (62) to hold the locking ring (62) in position.

The through hole is formed coaxially through the locking stationary leaf (64), is round and mounted rotatably around the shaft (12).

The mounting protrusion (641) is formed on the edge of the locking stationary leaf (63), attaches securely to the mounting protrusion (32) to connect the locking stationary leaf (64) and the mounting stationary leaf (30) together and has a distal end.

The sliding hole (642) is formed in the distal end of the mounting protrusion (641), corresponds to and is slidably mounted selectively around the sliding protrusion (633) and engages the sliding protrusion (633).

Consequently, the hinge allows a user to slide the external lock (73) to hold the sliding lock (63) in position against the locking ring (62) before rotating the pad (72), and then when the user rotates the pad (72) to the designed angle, the pad (72) will be held securely in position automatically to provide an operating angle for the notebook (80).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge for a notebook extension pad comprising
a pivoting assembly having
    an inner end;
    an outer end;
    a mounting leaf being formed on and extending from the outer end of the pivoting assembly; and
    a shaft being keyed, being formed on and extending from the inner end of the pivoting assembly and having a middle and a distal end;
a positioning disk being mounted coaxially and securely around the shaft and having
    an inner surface;
    a keyed hole being formed through the positioning disk and corresponding to and engaging the shaft; and
    at least one positioning protrusion being formed on and protruding from the inner surface of the positioning disk;

a limiting stationary leaf being rotatably mounted coaxially around the shaft, being adjacent to the inner surface of the positioning disk and having
an edge;
an inner surface;
a pivoting hole being round, being formed coaxially through the limiting stationary leaf and being mounted rotatably around the shaft;
multiple detents being formed separately in the edge of the limiting stationary leaf and corresponding respectively to and selectively engaging the positioning protrusion;
a mounting protrusion being formed on and extending from the edge of the limiting stationary leaf; and
a boss being formed on and protruding from the inner surface of the limiting stationary leaf;
a limiting disk being coaxially mounted securely around the shaft, being adjacent to the inner surface of the limiting stationary leaf and having
an edge;
a keyed hole being formed coaxially through the limiting disk, corresponding to and being mounted around the shaft; and
a positive stop being formed on and protruding radially from the edge of the limiting disk, corresponding to and selectively abutting the boss;
a pressing assembly being mounted coaxially around the shaft, being adjacent to the inner surface of the limiting disk, pressing and holding the limiting disk, the limiting stationary leaf and the positioning disk together; and
a locking assembly being mounted around the distal end of the shaft, being adjacent to the pressing assembly and having
a spring being mounted around the shaft
a lock ring being mounted slidably around the shaft, being adjacent to and abutting the spring and having
an inner surface pressing against the spring;
an outer surface;
a keyed hole being formed coaxially through the locking ring and engaging the shaft;
an edge; and
a locking protrusion being formed on and protruding perpendicularly away from the distal surface of the locking ring near the edge;
a sliding lock being mounted slidably and rotatably around the shaft, selectively pressing and holding the locking ring against the spring and having
an edge;
a through hole being round, being formed coaxially through the sliding lock and being mounted around the shaft;
a locking notch being formed in the edge of the sliding lock, corresponding to the locking protrusion and selectively engaging the locking protrusion; and
a handle being formed on and extends from the edge of the sliding lock and having an outer surface; and
a locking stationary leaf being mounted between the locking ring and the sliding lock, being mounted rotatably around the shaft, being securely connected to the limiting stationary leaf, abutting the locking ring and having an outer surface abutting the inner surface of the locking ring;
a through hole being formed coaxially through the locking stationary leaf, being round and being mounted rotatably around the shaft;
an edge; and
a mounting protrusion being formed on the edge of the locking stationary leaf, attaching securely to the mounting protrusion and has a distal end.

2. The hinge as claimed in claim 1, wherein
the shaft of the pivoting assembly further has a threaded segment formed on the middle of the shaft; and
the pressing assembly further comprises
two keyed washers being coaxially mounted securely around the shaft, one of the keyed washers pressing the limiting disk and each keyed washer having a keyed hole being formed coaxially through the keyed washer and corresponding to and being mounted around the shaft;
a resilient spacer being rotatably mounted coaxially around the shaft between the two keyed washers and having a pivoting hole being round, being formed coaxially through the resilient spacer and being mounted rotatably around the shaft; and
a nut being mounted securely around the threaded segment of the shaft and abutting one of the keyed washers.

3. The hinge as claimed in claim 1, wherein
the positioning disk further has a spacer corresponding to and being mounted securely around the shaft and being adjacent to the inner surface of the positioning disk; and
each positioning protrusion of the positioning disk is convex.

4. The hinge as claimed in claim 2, wherein
the positioning disk further has a spacer corresponding to and being mounted securely around the shaft and being adjacent to the inner surface of the positioning disk; and
each positioning protrusion of the positioning disk is convex.

5. The hinge as claimed in claim 1, wherein
the sliding lock further has a sliding protrusion being formed on and extending perpendicularly from the outer surface of the handle; and
the locking stationary leaf further has a sliding hole being formed in the distal end of the mounting protrusion, corresponding to and being slidably mounted selectively around the sliding protrusion of the sliding lock and engaging the sliding protrusion of the sliding lock.

6. The hinge as claimed in claim 4, wherein
the sliding lock further has a sliding protrusion being formed on and extending perpendicularly from the outer surface of the handle; and
the locking stationary leaf further has a sliding hole being formed in the distal end of the mounting protrusion, corresponding to and being slidably mounted selectively around the sliding protrusion of the sliding lock and engaging the sliding protrusion of the sliding lock.

7. The hinge as claimed in claim 1, wherein the positive stop of the limiting disk is a tab.

8. The hinge as claimed in claim 6, wherein the positive stop of the limiting disk is a tab.

* * * * *